United States Patent
Kipperberg

[15] 3,659,406
[45] May 2, 1972

[54] STRANDED CABLE OPEN STRAND DETECTOR

[72] Inventor: Palmer Kipperberg, c/o Wilson, King and Company, 390,444 Victoria Street, Prince George, British Columbia, Canada

[22] Filed: July 27, 1970

[21] Appl. No.: 58,633

[30] Foreign Application Priority Data

Aug. 1, 1969   Canada....................................058,497

[52] U.S. Cl..........................................57/19, 57/81, 73/158, 324/52
[51] Int. Cl........................................................G01r 31/08
[58] Field of Search..........................57/19, 34 R, 78, 80, 81; 29/624, 593; 73/158; 324/51, 52

[56] References Cited

UNITED STATES PATENTS

| | | |
|---|---|---|
| 3,287,887 | 11/1966 | Dornberger................................57/19 |
| 3,345,812 | 10/1967 | Pickering................................57/19 X |
| 2,944,378 | 7/1960 | Crosby et al............................57/19 X |
| 2,433,444 | 12/1947 | Eichinger................................57/19 X |
| 2,770,091 | 11/1956 | Frankel........................................57/81 |
| 3,035,395 | 5/1962 | Bohannon, Jr..............................57/19 |
| 3,460,334 | 8/1969 | Lawrenson et al.....................57/19 X |

*Primary Examiner*—John Petrakes
*Attorney*—Stevens, Davis, Miller & Mosher

[57] ABSTRACT

Cable inspection means comprise a probe arranged to move along the periphery of the cable and, upon encountering a gap in the strands, to move inwardly and thus provide an indication of a fault in the cable. The inward movement of the probe can be used to stop the operation of an associated cable winding machine, and/or to illuminate a relevant point on a mimic diagram of an installation including the inspection means.

6 Claims, 5 Drawing Figures

STRANDED CABLE OPEN STRAND DETECTOR

This invention relates to an inspection device for stranded cables, and is applied to a cable winding machine in order to detect certain faults which can occur during the operation of such a cable winding machine.

Although the invention may also find application to the inspection of heavy duty multi-strand cables of the hawser type such as are used for cranes and hoists, its main application is to the inspection of multi-strand electrical conductor cables. In the manufacture of such cables, the strands to be twisted to form a cable are initially wound on bobbins and these bobbins are mounted on a rotating plate and are themselves rotated, the strands from the bobbins being fed through a guide in which the strands are laid together in their proper relationship before passing through a final shaping stage.

An object of the present invention is the provision of an improved inspection device for stranded cables.

The present invention comprises stranded cable inspection means in which a probe is arranged to engage and move lengthwise over the surface of a helically stranded cable, the end of the probe which engages the cable is of such size that the probe can move inwardly of the cable should any outside strand of the cable be missing, the part of the probe engaging the cable is electrically insulated from an electrically conductive surface on a member carrying the probe, the probe is biased to move inwardly, the arrangement being such that when the probe moves inwardly of the cable in the said manner the electrically conductive surface engages the cable to complete an electrical circuit including the cable, and indicating and/or alarm means are arranged to provide an indication when the probe has moved inwardly of the cable in the said manner.

The invention will now be described, by way of example, with reference to the accompanying drawings, in which.

Figure 1:
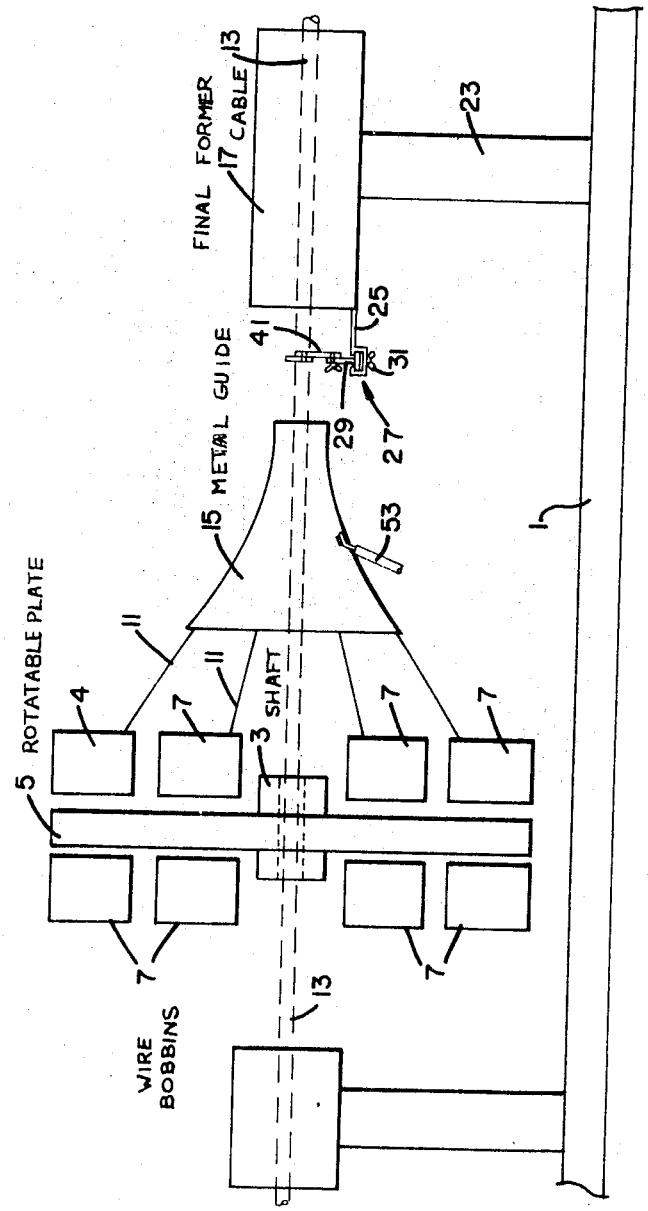
FIG. 1 is a schematic side elevation of the essential parts of a cable winding machine.

Referring first to FIG. 1, the cable winding machine shown therein is orthodox in that it includes a massive base or foundation 1 carrying pedestal bearings which in turn carries the hollow shaft 3 of a rotatable plate 5. Plate 5 is provided with bearings (not detailed) which in turn carry bobbins 7, and drive mechanism associated with the plate 5 causes these bobbins to rotate relative to the plate 5, as that plate rotates, but to remain at a constant orientation relative to the foundation 1. Each bobbin 7 carries one strand 11 of the final cable 13, and these strands are brought together through a metal guide 15 to form the cable 13. The cable passes from the guide 15 into a final former 17 consisting of two massive blocks 19 of wood clamped together and formed on their mating surfaces with grooves 21 of semi-circular cross section to form a final pass in which the laid strands of the cable are pressed into their final closely meshed form.

The final former 17 is mounted on a pedestal 23 carried by foundation 1, and this pedestal also has mounted on it an insulated bracket 25. The bracket is positioned below the cable 13 and is formed with a slideway 27 extending transversely across the cable, a slide 29 being mounted in the slideway and being capable of being locked in position by means of two clamping bolts 31 extending upwardly through screw-threaded holes in the bottom of the guideway. In transverse cross section, the slide is T-shaped, with its vertical leg 33 upwards, and near its upper end is formed with holes 37 one of which accommodates a bolt 39 by which an adjustable metal arm 41 is adjustably clamped to the slide. Arm 41 is also formed with a hole near its upper end, this hole accommodating a pivot pin 45 on which is mounted a pivoted metal arm 47.

The free end of arm 47 overlies the cable 13, and carries a thin pin 49 of electrically insulating material and of circular cross section which extends through the arm and, by suitable adjustment of the slide 29 in the slideway 27 and the arm 41 on the slide 29, is directed substantially radially towards the cable 13. A lock screw 50 holds pin 4 relative to arm 47. It will be seen from FIG. 3 that this pin 49 extends beyond an arcuate lower surface 47A of the pivoted arm 47, and the arrangement is such that normally this lower end of the insulating pin rubs on the outward surfaces of the strands forming the cable 13, and spaces the metal arm 47 from the cable 13. An electrical lead 51 is connected to the arm 41, and a further lead 53 is connected to the metal guide 15. Thus arm 47 acts as a switch connecting leads 51 and 53, and is carried by the fixed arm 41 and can be adjusted so that as long as the pin 49 is properly supported by the outward surfaces of the strands of the cable, the switch is "open," but upon the pin falling into a crevice in the cable, the switch becomes "closed."

Figure 2:
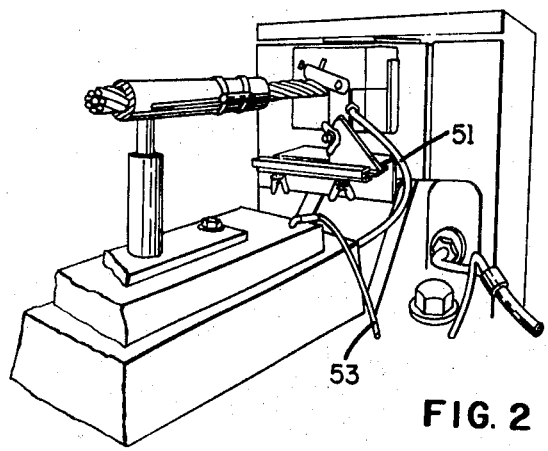
FIG. 2 is a perspective drawing of a cable inspection device indicated in FIG. 1.
Figure 3:
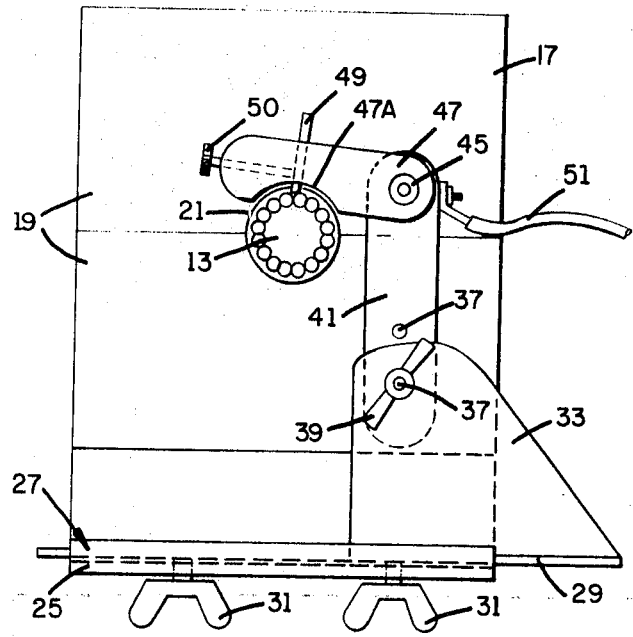
FIG. 3 is an end view of the device of FIG. 2.
Figure 4:
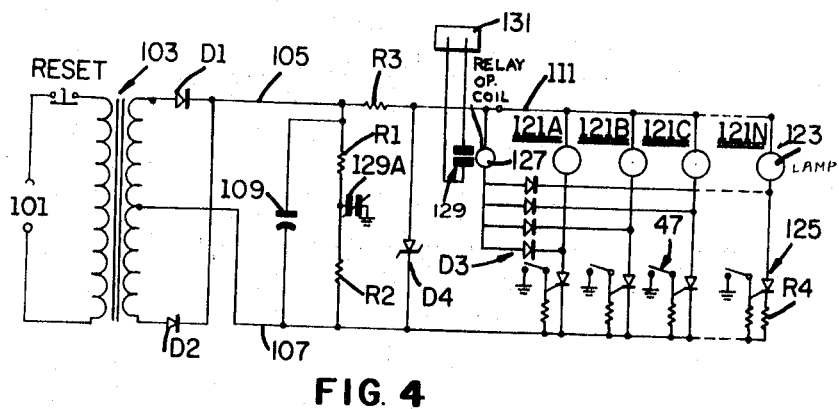
FIG. 4 is a circuit diagram of an indicating circuit associated with the inspection device.
Figure 5:
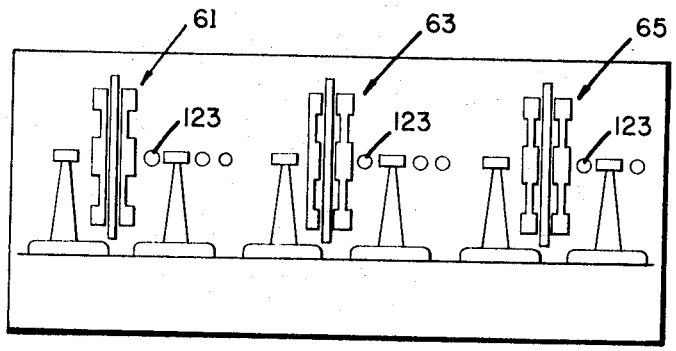
FIG. 5 is an illustration of a schematic diagram utilizing the circuit of FIG. 4 and providing a visual indication of the operation of the inspection device.

Referring now to the display unit shown in FIG. 5, it will be appreciated that the cable winding machine indicated in FIG. 1 is in fact merely one stage of a three stage machine. The cable is formed by passing from left-to-right through the three stages indicated in FIG. 5, in the first stage 61 a first layer of strands being formed into a cable with a left-hand "lay," in the second stage 63 a second layer of strands being applied to the first layer, but with a right-hand "lay," and in the third stage 65 a third layer of strands being applied on top of the second layer, but this time with a left-hand "lay." Thus three of the cable inspection devices of FIGS. 2 and 3 are utilized, in addition to other sensing devices forming no particular part of the present invention. However, these other sensing devices also provide an alarm condition when their switch contacts close, and they also can therefore be used as sensors associated with the circuit shown in FIG. 4 and used to light lamps on the display unit.

Referring now to FIG. 4, the left-hand side of the circuit shown provides a stable direct current supply from a standard 120 volts AC power supply. Thus the input terminals 101 are connected across the primary of a transformer 103 having a center-tapped secondary winding providing approximately 48 volts across its outer terminals. These outer terminals are connected respectively through diodes D1 and D2 to a positive "rail" 105 and the centre-tap is connected to a negative rail 107, between which rails is connected a smoothing capacitor 109. The system is stabilized relative to ground by two series connected resistors R1 of 10,000 ohms and R2 of 1,000 ohms, the common point of which is connected to ground. The positive rail 105 is connected through a resistor R3 of 50 ohms to a further positive rail 111, the potential between the positive rail 111 and the negative rail 107 being stabilized at 18 volts by a Zener diode D4 It will be appreciated that ground is then at approximately +4 volts relative to the negative rail 107.

Connected between positive rail 111 and negative rail 107 are $n$ indicated units 121A, 121B and 121C to 121N, each of which comprises an indicating lamp 123 in series with a silicon controlled rectifier 125. The trigger electrode of each SCR 125 is connected to the associated switch arm 47, which through cable 13 and lead 53 can be connected to ground. The trigger electrode is also connected through a resistor R4 of 1,000 ohms to the negative rail 107. Furthermore, the anode electrode of the SCR 125 is connected through a diode D3 to the operating coil 127 of an electromagnetic relay having contacts 129 connected in the circuit of a magnetic contactor 131 which controls the operation of a main driving motor for the cable winding machine, and one contact disconnecting the triggering voltage to avoid a false indication (129A)

During normal operation of the apparatus described above, as the cable winding machine is operated by its main driving motor, the partly formed cable passes through the three stages 61, 63 and 65. At each stage, a cable inspection device as described in connection with FIGS. 1 to 3 includes a probe which is held against the cable by the weight of the pivoted arm 47. If there are no gaps in the cable, the pin 49 will engage the cable strands and the metal pivoted arm 47 will remain out of contact with the cable, so that the circuit between the trigger electrode of the associated silicon controlled rectifier 125 and ground will be open. The trigger electrode will therefore (through the resistor R4) acquire the potential of the negative rail 107 and the SCR 125 will pass only a very small leakage current. Since the anode of each SCR 125 will be substantially at the potential of the positive rail 111, no appreciable current will flow through the relay coil 127, and the contacts 127 will remain closed. Thus the cable winding operation can proceed smoothly.

If, however, a gap appears in the cable 13 where it passes under the pin 49, that pin will fall into the gap and will permit the arm 47 to drop so that it will contact the cable 13. It will be appreciated that since the strands are helically wound, any missing strand will always trip the pin 49 with a travel of the cable 13 less than one strand pitch. An electrical circuit is then completed from the trigger electrode of the SCR 125 through lead 51, arms 41 and 47, cable 13, guide 15, lead 53 and earth. This immediately makes the trigger electrode of the SCR 125 about +4 volts relative to its cathode, and the silicon controlled rectifier used is so chosen that the trigger current then produced causes the SCR to conduct. This illuminates the associated lamp 123, and the resistance of that lamp causes a drop in the anode voltage of the SCR 125. With this drop in voltage, a voltage appears across the relay coil 127, which passes a current causing the contacts 129 to open. The circuit of contacts 129 is such that this opening trips the magnetic contactor 131 of the main driving motor, stopping that motor and thus the whole cable winding operation. The operator can tell immediately by inspecting the lamps 123 on the display unit of FIG. 5, which cable inspecting device has located a fault, and can thus go straight to the cause of the trouble and take appropriate remedial action.

It will be seen that the apparatus described is both simple and rugged, and these are important features in the environment of a cable winding machine. As mentioned above, other sensors can be used to illuminate other lamps of the circuit of FIG. 4.

I claim:
1. Stranded-cable inspection means comprising:
   a. a probe arranged to engage and move lengthwise over the surface of a helically stranded cable to be inspected;
   b. a cable-engaging end of the probe of such size that the probe can move inwardly of the said cable should any outside strand of the cable be missing;
   c. a member carrying the probe;
   d. an electrically conductive surface on the said member;
   e. electrical insulation electrically isolating the said cable-engaging end of the probe from the said conductive surface;
   f. biasing means by which the cable-engaging end of the probe is biased to move inwardly of the said cable surface; the arrangement being such that when the said probe end moves inwardly of the cable as the cable-engaging end of the probe enters a cavity resulting from a missing outside strand, the said electrically conductive surface engages the said cable surface to complete an electrical circuit including the cable; and
   g. indicating means arranged to provide an indication when the said electrical circuit is completed.
2. Cable inspection means according to claim 1, in which:
   a. the probe is formed of electrically insulating material;
   b. a pivoted metal arm carries the probe;
   c. the biasing means tend to bring the metal arm into contact with the cable;
   d. the probe normally holds the metal arm out of contact with the cable; and
   e. when the probe encounters a cavity in the cable surface, the biasing means bring the metal arm into contact with the cable.
3. Cable inspection means according to claim 2, in which
   a. the pivoted metal arm is mounted in an adjustable manner permitting adjustment of the probe relative to the cable;
   b. the probe can by this adjustment readily be set to serve with different diameters of cable.
4. Cable inspection means according to claim 1, in which
   a. the indicating means includes a warning lamp;
   b. a controlled rectifier is arranged when conductive to energize the said lamp; energized
   c. the controlled rectifier includes a trigger electrode;
   d. the said electrical circuit is arranged to provide an electrical trigger pulse to said trigger electrode upon the probe encountering a cavity in the said cable surface.
5. Cable inspection means according to claim 4, in which:
   a. a plurality of warning lamps is provided;
   b. a display panel pictorially represents a cable winding machine to which the cable inspection means is applied; and
   c. the said warning lamps are positioned on the display panel and are energised to indicate the occurrence of cable faults at different locations in the said cable winding machine.
6. Cable inspection means according to claim 4, in which:
   a. the inspection means are applied to a cable winding machine;
   b. a main driving motor is arranged to drive the said cable winding machine;
   c. the said controlled rectifier is arranged to control the energization of the said main driving motor;
   d. the said controlled rectifier is arranged to de-energize the said main driving motor when the probe encounters a cavity in the said cable surface.

* * * * *